July 15, 1958  J. GREAVES  2,843,262
GRAIN SAVING ATTACHMENT
Filed Jan. 23, 1957

INVENTOR
JOSEPH GREAVES,
BY
ATTORNEY

United States Patent Office 2,843,262
Patented July 15, 1958

2,843,262

GRAIN SAVING ATTACHMENT

Joseph Greaves, Toston, Mont.

Application January 23, 1957, Serial No. 635,781

6 Claims. (Cl. 209—26)

This invention relates to a harvesting combine grain saving attachment and is a continuation-in-part of application Serial No. 619,809, filed November 1, 1956, now abandoned.

Harvesting combines as heretofore constructed generally involve an upper sieve or screen, an upper pan beneath said screen, a lower sieve or screen beneath said upper pan, a lower pan beneath said second sieve or screen, a fan or blower disposed beneath said upper screen, a hopper elevator, disposed between said fan and said pans and screens and a return elevator from said hopper elevator to a point adjacent the rear end of said first screen and above same for discharge of straw and chaff in operation of the combine.

While such combines have been generally satisfactory in use, it has been found that a substantial volume of grain has been allowed to escape through said opening and lost on the ground.

It is accordingly a primary object of this invention to modify such prior forms of combine to the extent of discarding the upper pan, and the lower sieve together with the return elevator and providing a grain saving attachment which is operatively supported inwardly of and adjacent said opening and at the rear end of said upper screen.

A further object of the invention is the provision of a grain saving attachment embodying adjustable panels for varying the depth of said opening from the upper limit thereof for maximum efficiency in the discharge of chaff and the complete retention of grain under different operating conditions of the combine.

Other objects and advantages of the invention will become apparent in the course of the following detailed description, taken in connection with the accompanying drawing, wherein.

Figure 1:
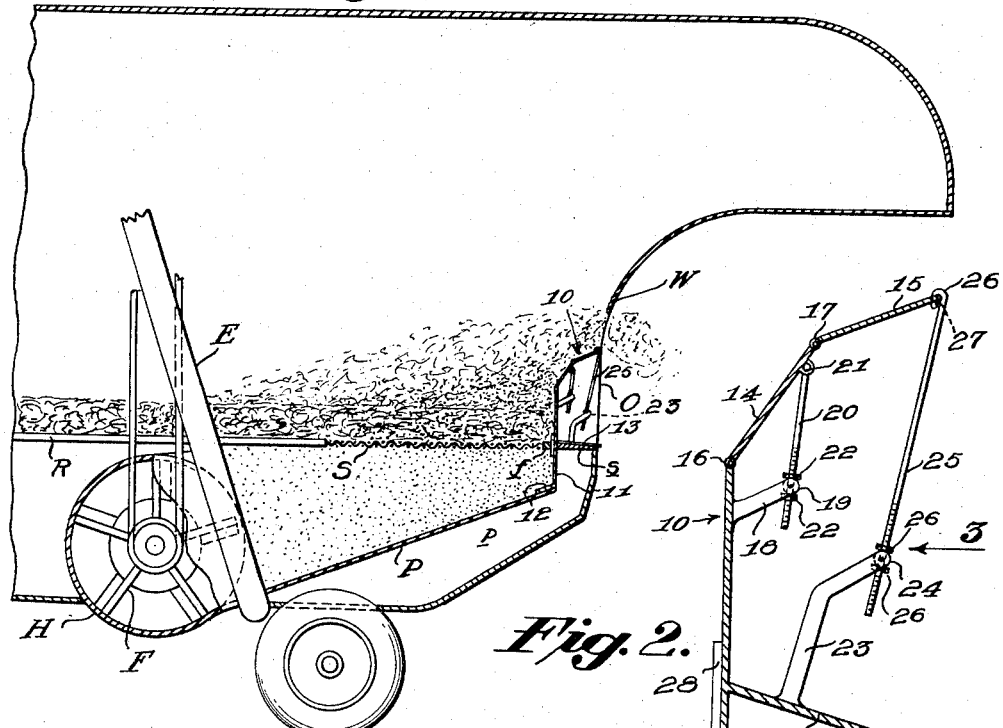
Figure 1 is a fragmental side elevational and longitudinal sectional view of a standard form of harvesting combine modified in accordance with the present invention.
Figure 2:
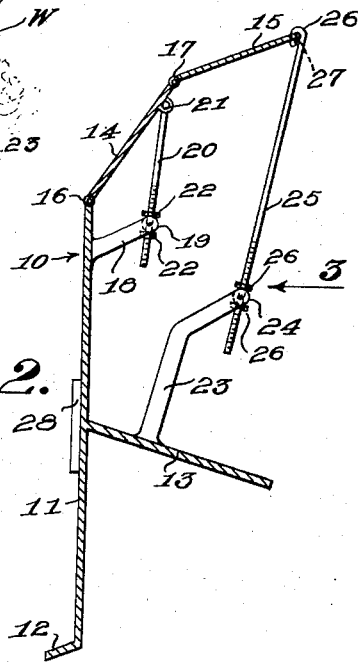
Figure 2 is a transverse sectional view of the improved grain saving attachment in a preferred structural embodiment thereof, the section being taken substantially in the plane of line 2—2 on Figure 3.
Figure 3:
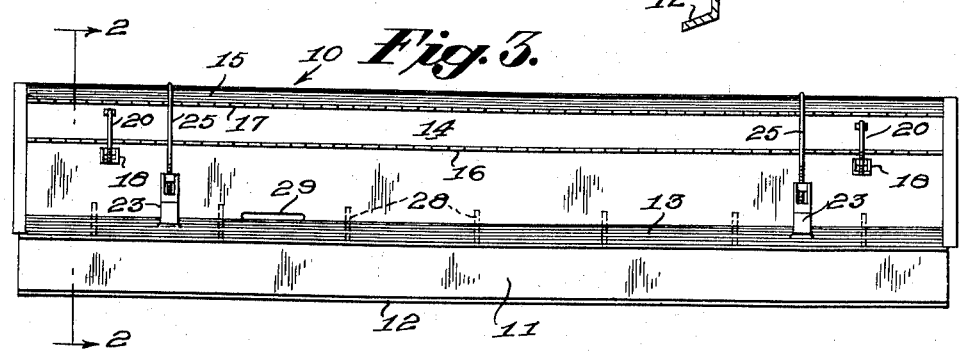
Figure 3 is a rear elevational view of the grain saving attachment.

Referring now in detail to the drawing, and first to Figure 1 thereof, the combine as modified for reception of the attachment comprises together with other cooperating elements, a straw rack R, an upper screen S, a grain collecting pan P, an elevator E and a fan or blower F whose housing H opens into the elevator E and with which elevator the pan P also communicates.

As is indicated in Figure 1 the heretofore utilized grain return passage *p* is closed by a slot *s* and the screen frame *f* is disposed adjacent to and in relatively closely spaced relation to the forward edge of the slat. The rear wall W of the combine is provided with an opening O for discharge of the straw and chaff.

The improved attachment 10 constituting the present invention comprises a vertical panel 11 having an angularly disposed foot 12 on the lower edge thereof. Rigid with the panel 11 and projecting obtusely from the side thereof opposite the foot 12 is an attaching base plate or skirt 13 and which is adapted to overlie and be suitably secured to the upper face of slat *s* with panel 11 being disposed between the screen frame *f* and the slat and the foot 12 is adapted to overlie and be secured to pan P in closing off the rear end thereof.

The panel 11 projects a substantial distance above the base plate 13 and in use such panel is disposed in inwardly spaced relation to the chaff discharge opening O as is clearly indicated in Figure 1.

A pair of adjustable panels 14 and 15 are provided with one edge of the former hingedly connected to the upper edge of panel 11 as indicated at 16 and with adjacent edges of panels 14 and 15 hingedly connected as indicated at 17.

A pair of lugs 18 are rigidly secured to panel 11 adjacent the upper edge thereof and each of which is provided with a rotatable cylinder 19 having a diametrical opening therein. A rod 20 cooperates with each lug and has the upper end thereof pivotally secured to panel 14 as at 21 and the opposite ends of the rods are threaded and freely extend through said diametrical openings and are provided with adjusting nuts 22 for effecting longitudinal adjustment of the rods 20 and corresponding adjustment of panel 14.

A pair of lugs 23 are rigid with base plate or skirt 13 and project upwardly therefrom and which lugs are provided with rotatable cylinders 24 through diametrical openings in which the threaded ends of rods 25 extend and which threaded rods are provided with adjusting nuts 26. The rods 25 have hooks 26 on their upper ends which engage within apertures 27 adjacent the free edge of panel 15 whereby same may be adjusted relative to panel 14. The panel 11 is disposed intermediate the screen frame *f* and the slat *s* and same is provided with longitudinally spaced ribs 28 whose outer edges engage the outer side of frame *f* for a purpose later to appear.

In operation of the structure as above described, the speed of the fan F may be substantially accelerated to provide a strong blast of air upwardly through the screen S and as the grain and chaff drift off the rack together they are forced into mid air. The chaff and ground-up green weeds being lighter than the grain separate therefrom and blow over the attachment 10 and through the opening O. The grain being heavier falls evenly on the screen S and the screen being clean the grain passes through same and to the elevator E.

The attachment 10 blocks a substantial lower portion of the opening O and prevents the heretofore lost grain from moving rearwardly on the screen and passing through the opening O.

Since it is necessary to provide for discharge of the straw and chaff through the opening O the panels 14 and 15 of attachment 10 may be adjusted for most efficient discharge of the straw and chaff while retaining the grain against passage through such opening.

By the provision of the ribs 28 the lodging of chaff on the grain saving attachment is prevented.

Although the grain saving attachment comprising my invention eliminates the necessity of having an upper pan and a lower sieve as are now found on present combines, it may also be attached to a combine having these members mounted thereon without the necessity of removing them and my device will still serve its intended function of preventing the grain from escaping through the aforementioned opening and thereby becoming lost.

While only one detail embodiment of the invention has been disclosed, it is to be expressly understood that changes and modifications may be made within the scope of the appended claims. Reference is, therefore to be had to the appended claims for a determination of the scope of the invention.

What I claim and desire to secure by U. S. Letters Patent is:

1. In a harvesting combine, a body, a horizontal screen disposed in said body adjacent the rear end thereof, a grain collecting pan disposed beneath said screen with an upwardly and rearwardly extending passage between same and the rear wall of said body, an elevator with which said pan communicates, a fan having a housing communicating with said elevator, a chaff dispensing opening in the rear wall of said body rearwardly of and above said screen, a horizontal slat closing the upper end of said passage and whose forward edge is disposed in relatively closely spaced relation to the rear edge of said screen, a grain saving attachment supported on said slat adjacent said opening and being adjustable to vary the operative area thereof, said attachment comprising a vertically disposed panel extended through the space between said slat and said screen, and the lower edge of said panel being provided with a foot member engageable with the bottom wall of said pan.

2. The structure according to claim 1, wherein said panel is provided with a series of longitudinally spaced vertical ribs disposable within said space for preventing the lodging of chaff on the attachment.

3. The structure according to claim 2 wherein said attachment further comprises a pair of panels having adjacent edges thereof hingedly connected, and wherein one of the panels is hingedly connected to the upper edge of said first panel, and means for adjusting said panels relative to each other and to said first panel.

4. A grain saving attachment for operative disposition within a chaff dispensing opening in the rear end wall of a harvesting combine, comprising a vertical panel, a supporting skirt projecting from the rear wall of said panel, a second panel having one edge thereof hingedly connected to the upper edge of said first panel, a third panel having one edge thereof hingedly connected to the other edge of said second panel, and means for adjusting said second and third panels about the axes of the hinge connections.

5. The structure according to claim 4, wherein said adjusting means comprise a pair of lugs rigid with said first panel, a pair of lugs rigid with said skirt, a rod having a longitudinal adjustable connection with each of said first pair of lugs and whose opposite ends are connected to said second panel, and a rod having a longitudinal adjustable connection with each of said second pair of lugs and whose opposite ends are connected to said third panel.

6. The structure according to claim 4 wherein said first panel is provided with a series of longitudinally spaced vertical ribs on the wall thereof opposed to said skirt.

References Cited in the file of this patent

UNITED STATES PATENTS

| Number | Name | Date |
|---|---|---|
| 767,184 | Thomson | Aug. 9, 1904 |
| 810,774 | Kyllonen | Jan. 23, 1906 |
| 1,026,529 | Rainforth | May 14, 1912 |
| 2,574,010 | Bjorndahl | Nov. 6, 1951 |
| 2,670,845 | Busack et al. | Mar. 2, 1954 |
| 2,699,867 | Kitten et al. | Jan. 18, 1955 |